(12) United States Patent
Anderson et al.

(10) Patent No.: US 8,454,780 B2
(45) Date of Patent: Jun. 4, 2013

(54) METHOD OF MAKING LAMINATE STRUCTURES FOR MECHANICAL ACTIVATION

(75) Inventors: Barry Jay Anderson, Spokane, WA (US); Anand Rudra Venkitaraman, Cincinnati, OH (US); George Stephen Reising, Batavia, OH (US); Jean-Philippe Marie Autran, Wyoming, OH (US); Joseph Leslie Grolmes, Madeira, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 258 days.

(21) Appl. No.: 12/556,621

(22) Filed: Sep. 10, 2009

(65) Prior Publication Data

US 2010/0041293 A1 Feb. 18, 2010

Related U.S. Application Data

(60) Continuation of application No. 11/361,918, filed on Feb. 24, 2006, now abandoned, and a continuation-in-part of application No. 12/053,659, filed on Mar. 24, 2008, now Pat. No. 8,158,846, which is a continuation of application No. 10/417,457, filed on Apr. 16, 2003, now Pat. No. 7,378,565, which is a division of application No. 09/669,329, filed on Sep. 25, 2000, now Pat. No. 6,605,172.

(60) Provisional application No. 60/156,900, filed on Sep. 30, 1999.

(51) Int. Cl.
 *B32B 37/20* (2006.01)

(52) U.S. Cl.
 USPC .......................................... 156/160; 156/229

(58) Field of Classification Search
 USPC ............ 156/160, 229; 264/197, 198; 604/358
 See application file for complete search history.

(56) References Cited

U.S. PATENT DOCUMENTS

| 3,156,342 A | 11/1964 | Clifford |
| 3,690,977 A | 9/1972 | Loft et al. |
| 3,860,003 A | 1/1975 | Buell |

(Continued)

FOREIGN PATENT DOCUMENTS

| EP | 99/5413 A1 | 4/2000 |
| EP | 99/5414 B1 | 9/2003 |

(Continued)

OTHER PUBLICATIONS

U.S. Appl. No. 11/361,918, filed Feb. 24, 2006, Office Actions and Responses beginning Feb. 24, 2006.

(Continued)

*Primary Examiner* — George Koch
(74) *Attorney, Agent, or Firm* — Thibault Fayette (57) ABSTRACT

A method for producing a stretch laminate includes forming an intermediate stretch laminate. Forming the intermediate stretch laminate includes providing a first substrate and attaching an elastic film to a surface of the first substrate via an adhesive. The first substrate and the elastic film are in a face to face orientation. The intermediate stretch laminate has a residual energy of greater than or equal to 50% at a predetermined applied strain. The method of forming the stretch laminate further includes mechanically activating the intermediate stretch laminate at a strain rate of at least 100 s$^{-1}$.

16 Claims, 6 Drawing Sheets

U.S. PATENT DOCUMENTS

| | | | |
|---|---|---|---|
| 3,881,489 A | 5/1975 | Hartwell | |
| 3,989,867 A | 11/1976 | Sisson | |
| 4,116,892 A | 9/1978 | Schwarz | |
| 4,153,664 A | 5/1979 | Sabee | |
| 4,153,751 A | 5/1979 | Schwarz | |
| 4,289,832 A | 9/1981 | Schwarz | |
| 4,472,328 A | 9/1984 | Sugimoto et al. | |
| 4,539,256 A | 9/1985 | Shipman | |
| 4,609,584 A | 9/1986 | Cutler et al. | |
| 4,753,840 A | 6/1988 | Van Gompel | |
| 4,777,073 A | 10/1988 | Sheth | |
| 4,834,741 A | 5/1989 | Sabee | |
| 4,940,464 A | 7/1990 | Van Gompel et al. | |
| 5,032,120 A * | 7/1991 | Freeland et al. | 604/385.27 |
| 5,035,941 A | 7/1991 | Blackburn | |
| 5,092,861 A | 3/1992 | Nomura et al. | |
| 5,156,793 A | 10/1992 | Buell et al. | |
| 5,156,897 A | 10/1992 | Liu | |
| 5,167,897 A | 12/1992 | Weber et al. | |
| 5,221,274 A | 6/1993 | Buell et al. | |
| 5,246,433 A | 9/1993 | Hasse et al. | |
| 5,409,761 A | 4/1995 | Langley | |
| 5,422,172 A | 6/1995 | Wu | |
| 5,492,753 A | 2/1996 | Levy et al. | |
| 5,518,801 A | 5/1996 | Chappell et al. | |
| 5,554,145 A | 9/1996 | Roe et al. | |
| 5,569,234 A | 10/1996 | Buell et al. | |
| 5,580,411 A | 12/1996 | Nease et al. | |
| 5,582,903 A | 12/1996 | Levy et al. | |
| 5,626,571 A | 5/1997 | Young et al. | |
| 5,628,097 A | 5/1997 | Benson et al. | |
| 5,650,214 A | 7/1997 | Anderson et al. | |
| 5,865,926 A | 2/1999 | Wu et al. | |
| 5,897,545 A | 4/1999 | Kline et al. | |
| 5,899,895 A | 5/1999 | Robles et al. | |
| 5,910,225 A | 6/1999 | Mcamish et al. | |
| 5,914,084 A | 6/1999 | Benson et al. | |
| 5,957,908 A | 9/1999 | Kline et al. | |
| 6,013,151 A | 1/2000 | Wu et al. | |
| 6,114,263 A | 9/2000 | Benson et al. | |
| 6,120,487 A | 9/2000 | Ashton | |
| 6,120,489 A | 9/2000 | Johnson et al. | |
| H1927 H | 12/2000 | Chen et al. | |
| 6,277,479 B1 | 8/2001 | Campbell et al. | |
| 6,605,172 B1 | 8/2003 | Anderson et al. | |
| 6,843,134 B2 | 1/2005 | Anderson et al. | |
| 6,915,700 B2 | 7/2005 | Anderson et al. | |
| 7,024,939 B2 | 4/2006 | Anderson et al. | |
| 7,378,565 B2 | 5/2008 | Anderson et al. | |
| 2002/0042599 A1 | 4/2002 | Zhao et al. | |
| 2003/0207640 A1 | 11/2003 | Anderson et al. | |
| 2003/0233082 A1 | 12/2003 | Kline et al. | |
| 2004/0173036 A1 | 9/2004 | Anderson et al. | |
| 2005/0106980 A1 * | 5/2005 | Abed et al. | 442/395 |
| 2005/0287892 A1 | 12/2005 | Fouse et al. | |
| 2007/0202767 A1 | 8/2007 | Anderson et al. | |
| 2008/0228159 A1 | 9/2008 | Anderson et al. | |

FOREIGN PATENT DOCUMENTS

| | | |
|---|---|---|
| WO | WO-96/16562 A1 | 6/1996 |
| WO | WO-96/31345 A1 | 10/1996 |
| WO | WO-97/47264 A1 | 12/1997 |
| WO | WO-98/05813 A1 | 2/1998 |
| WO | WO-98/37266 A1 | 8/1998 |
| WO | WO-98/51475 A1 | 11/1998 |
| WO | WO-99/22930 A1 | 5/1999 |
| WO | WO-99/32272 A1 | 7/1999 |
| WO | WO-99/32698 A1 | 7/1999 |
| WO | WO-99/37840 A1 | 7/1999 |
| WO | WO-99/45871 A1 | 9/1999 |
| WO | WO-99/62449 A2 | 12/1999 |
| WO | WO-00/06377 A1 | 2/2000 |

OTHER PUBLICATIONS

U.S. Appl. No. 09/669,329, filed Sep. 25, 2000, Office Actions and Responses beginning Sep. 25, 2000 to Aug. 12, 2003.

U.S. Appl. No. 10/417,457, filed Apr. 16, 2003, Office Actions and Responses beginning Apr. 16, 2003 through May 27, 2008.

U.S. Appl. No. 12/053,659, filed Mar. 24, 2008, Office Actions and Responses beginning Mar. 24, 2008.

* cited by examiner

METHOD OF MAKING LAMINATE STRUCTURES FOR MECHANICAL ACTIVATION

CROSS REFERENCE TO RELATED APPLICATION

This application is a continuation of application Ser. No. 11/361,918, filed Feb. 24, 2006, now abandoned the substance of which is incorporated herein by reference. This application is a continuation in part of U.S. application Ser. No. 12/053,659, filed Mar. 24, 2008 now U.S. Pat. No. 8,158,846, which is a continuation of U.S. application Ser. No. 10/417,457, filed Apr. 16, 2003 now U.S. Pat. No. 7,378,565, which is a divisional application of U.S. application Ser. No. 09/669,329, filed Sep. 25, 2000 now U.S. Pat. No. 6,605,172, which claimed the benefit under 35 USC 119(e) of application Ser. No. 60/156,900, filed Sep. 30, 1999.

FIELD OF THE INVENTION

The present invention relates to a stretch laminate and a method of producing the stretch laminate such that the stretch laminate exhibits reduced defects from mechanical activation. The stretch laminate may be used in a variety of articles and is particularly useful in disposable absorbent articles such as baby diapers, adult incontinence articles, feminine hygiene articles, baby swim diapers, bibs, wound dressings, and any other articles where an elastically extensible stretch laminate may be desirable.

BACKGROUND OF THE INVENTION

Stretch laminates can be used in a wide variety of disposable absorbent articles. For example, in order to provide a disposable absorbent diaper which can fit a range of wearers and minimize leaks, disposable absorbent diapers often include stretch laminates. Because the wearers of disposable absorbent diapers vary in size, stretch laminates are often used in the waist region and leg regions of the disposable absorbent diaper, thereby allowing the disposable absorbent diaper to fit a wide range of wearers.

A conventional stretch laminate often has at least two nonwoven materials and at least one elastic film sandwiched between the two nonwoven materials. In general, the two nonwoven materials are attached to the elastic film via an adhesive.

In some cases, stretch laminates used in disposable absorbent articles are mechanically activated. The mechanical activation process can involve meshing the stretch laminate between activation rolls which have protruding teeth. Typically, an activation region of the stretch laminate is intermeshed between the teeth of the activation rolls as the stretch laminate passes through the activation rolls. A tack down region disposed outboard of the activation region typically is not intermeshed between the protruding teeth of the activation rolls. Because the activation region of the stretch laminate is intermeshed between the teeth of the activation rolls, the nonwoven materials are permanently elongated at least to a certain degree, so that upon release of the applied tensile forces, the stretch laminate generally will not fully return to its original undistorted configuration. Such orientation and alignment is common throughout the industry.

This process of making a stretch laminate elastically extensible is called "mechanical activation" or "ring rolling". The mechanical activation process is typically performed at high speeds. Consequently, the stretch laminate experiencing the mechanical activation process can be exposed to very high strain rates. Moreover, in order to provide the stretch laminate with greater extensibility, the stretch laminate may further be exposed to high percentages of strain which, in turn, can also increase the strain rate experienced by the stretch laminate in the mechanical activation process.

Unfortunately, many stretch laminates may incur defects, in part, as a result of the high strain rates and high percentages of strain experienced during the mechanical activation process. Many of the defects are structural in nature. For example, an elastic film which undergoes the mechanical activation process may experience defects such as holes which reduce the structural integrity of the elastic film. The reduction of the structural integrity of the elastic film can lead to premature failure of the stretch laminate.

Consequently, it would be beneficial to provide a stretch laminate which exhibited reduced defects from the mechanical activation process. Additionally, a process for creating a stretch laminate which can withstand the mechanical activation process and exhibit reduced defects therefrom is needed.

SUMMARY OF THE INVENTION

The method of the present invention may produce stretch laminates which exhibit reduced defects from a mechanical activation process. The method of producing a stretch laminate comprises the steps of forming an intermediate stretch laminate. Forming an intermediate stretch laminate comprises the steps of providing a first substrate and attaching an elastic film to a surface of the first substrate such that the elastic film and the first substrate are in a face to face orientation. The elastic film can be attached to the first substrate via an adhesive. The intermediate stretch laminate has a residual energy of greater than or equal to 50% at a predetermined applied strain. The method of producing a stretch laminate further comprises the step of mechanically activating the intermediate stretch laminate at a strain rate of at least $100\ s^{-1}$.

An intermediate stretch laminate of the present invention can incur reduced defects from a mechanical activation process. In some embodiments, the intermediate stretch laminate may comprise a first nonwoven, an elastic film, and a second nonwoven. The elastic film can be attached to the first nonwoven via an adhesive such that the elastic film and the first nonwoven are in a face to face orientation. The second nonwoven can be attached to the elastic film via an adhesive. The second nonwoven can be attached to the elastic film opposite the first nonwoven such that the second nonwoven and the elastic film are in a face to face orientation. The intermediate stretch laminate has a residual energy which is greater than about 50%.

DETAILED DESCRIPTION OF THE INVENTION

Definitions

The following terminology is used herein consistent with the plain meaning of the terms with further details provided in the present specification.

As used herein, the term "absorbent article" refers to devices that absorb and contain body exudates and, more specifically, refers to devices that are placed against or in proximity to the body of a wearer to absorb and contain the various exudates discharged from the body.

The terms "activating", "activation", or "mechanical activation" refer to the process of making a substrate, or an elastomeric laminate more extensible than it was prior to the process.

"Basis weight" refers to the weight of a planar material for a given surface area. Basis weight is typically measured in grams per square meter (gsm). The basis weight of a stretch laminate is typically measured while the stretch laminate is in an unstrained configuration.

The terms "corrugations" or "rugosities" are used to describe hills and valleys that occur in a substrate or in a laminate structure. Note that neither term, i.e. "corrugations" or "rugosities" mandates that either the hills or valleys created are uniform in nature.

As used herein, the term "diaper" refers to an absorbent article generally worn by infants and incontinent persons about the lower torso so as to encircle the waist and legs of the wearer and that is specifically adapted to receive and contain urinary and fecal waste. As used herein, term "diaper" also includes "pants" which is defined below.

The term "disposable" is used herein to describe products, which generally are not intended to be laundered or otherwise restored and reused for their original function. They are typically intended to be discarded after about 1 or 2 uses. It is preferred that such disposable articles be recycled, composted or otherwise disposed of in an environmentally compatible manner.

A "disposable absorbent article" refers to an article device that normally absorbs and/or retains fluids. In certain instances, the phrase refers to articles that are placed against or in proximity to the body of the wearer to absorb and contain the excreta and/or exudates discharged from the body, and includes such personal care articles as baby diapers, baby training pants, adult incontinence articles, feminine hygiene articles, baby swim diapers, wound dressings, and the like. A disposable absorbent article may be worn by infants and other incontinent persons about the lower torso.

As used herein "elastically extensible" refers to characteristics of extensible materials that have the ability to return to approximately their original dimensions after a force that extended the extensible material is removed. Herein, any material or element described as "extensible" may also be "elastically extensible" unless otherwise provided.

The terms "face to face arrangement" or "face to face orientation" as used herein refer to the joining of a first element to a second element, wherein at least a portion of the first element overlaps at least a portion of the second element or vice versa. Note that the joining of the first element and the second element does not necessarily mean that a face of the first element and a face of the second element are directly bonded or in contact with one another. There may be some intermediate element which resides between the first element and the second element. The first element and the second element in this context may comprise at least one of a substrate, a nonwoven, a plurality of elastomeric strands, or any combination thereof.

As used herein "intermediate stretch laminate" refers to a stretch laminate which is not yet mechanically activated unless otherwise noted.

The term "joined" herein encompasses configurations whereby a material or component is secured directly or indirectly (by one or more intermediate members) to another material or component. An example of indirect joining is an adhesive. Direct bonding includes heat and or pressure bonding. Joining may include any means known in the art including, for example, adhesives, heat bonds, pressure bonds, ultrasonic bonds, and the like.

The term "longitudinal" is used herein to refer to a direction which is generally parallel to the longest edge of a laminate or a substrate. If the laminate or substrate has no edge which has a longer length than other edges, then the "longitudinal" direction extends parallel to an edge, if more than one edge, or tangent to the edge, if only one edge. In the context of disposable absorbent articles, a "longitudinal" direction runs from one waist edge of a disposable absorbent article to an opposing waist edge of the disposable absorbent article and generally parallel to a line which corresponds to the maximum linear dimension of the disposable absorbent article. Directions within ±45° of the longitudinal direction are considered to be "longitudinal".

The term "lateral" refers to a direction running generally perpendicular and in the same plane as the "longitudinal" direction. In the context of disposable absorbent articles, a "lateral" direction runs from one side edge of the article to an opposing side edge of the article and generally at a right angle to the longitudinal direction and in the same plane as the longitudinal direction. Directions within ±45° of the lateral direction are considered to be "lateral".

The terms "pant", "training pant", "closed diaper", "prefastened diaper", and "pull-on diaper", as used herein, refer to disposable garments having a waist opening and leg openings designed for infant or adult wearers. A pant can be configured such that the pant has a closed waist and leg openings prior to being donned on the wearer, or the pant can be configured such that the waist is closed and the leg openings formed while on the wearer. A pant may be preformed by any suitable technique including, but not limited to, joining together portions of the article using refastenable and/or non-refastenable bonds (e.g., seam, weld, adhesive, cohesive bond, fastener, etc.). A pant may be preformed anywhere along the circumference of the article (e.g., side fastened, front waist fastened, rear waist fastened). Examples of suitable pants are disclosed in U.S. Pat. Nos. 5,246,433; 5,569,234; 6,120,487; 6,120,489; 4,940,464; 5,092,861; 5,897,545; 5,957,908; and U.S. Patent Publication No. 2003/0233082 A1.

The term "nonwoven" refers herein to a material made from continuous (long) filaments (fibers) and/or discontinuous (short) filaments (fibers) by processes such as spunbonding, meltblowing, and the like. Nonwovens do not have a woven or knitted filament pattern. Nonwovens are typically described as having a machine direction and a cross direction. The machine direction is the direction in which the nonwoven is manufactured. Nonwovens are typically formed with a machine direction that corresponds to the long or rolled direction of fabrication.

The term "substrate(s)" refers herein to a material suitable for use in an elastomeric laminate, particularly for use in a disposable absorbent article. Examples of such materials are films, nonwovens, wovens, fabrics, and other materials known in the art for use in elastomeric laminates in absorbent articles.

As used herein "process applied strain" refers to a calculated maximum strain of a mechanical activation process which is being simulated.

Description

Stretch laminates constructed in accordance with the present invention may exhibit a reduced number of defects from a mechanical activation process. The method of the present invention can produce a stretch laminate which exhibits a reduced number of defects even when subjected to a high strain rate during the mechanical activation process. Strain rates are discussed hereafter in regard to Table I and Table II.

The stretch laminate of the present invention may be incorporated into any suitable part or suitable element of an absorbent article. For example, the stretch laminate of the present invention may be incorporated in an ear panel which is attached to the absorbent article. In yet another example, the stretch laminate of the present invention may also be included in a waist region or leg region of a pant. The stretch laminate of the present invention can be incorporated into an absorbent article such as a diaper or a pant in any location or region where it would be desirable to incorporate the properties of a stretch laminate.

Figure 1:
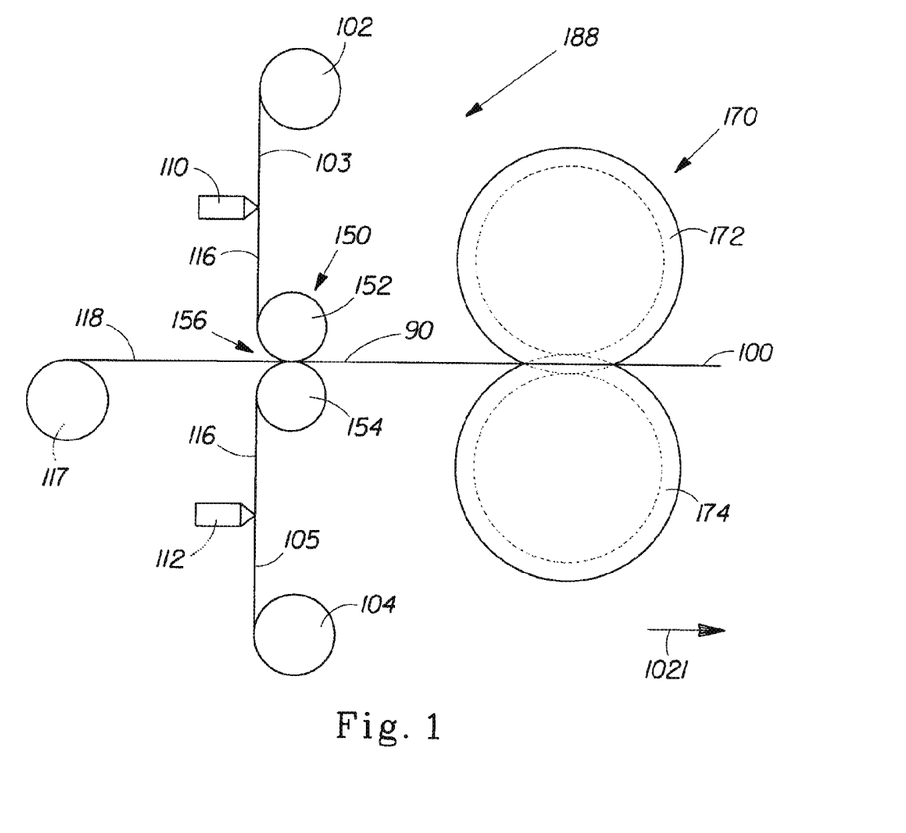
FIG. 1 is a schematic view showing a process for creating a stretch laminate of the present invention.

As shown in FIG. 1, in some embodiments, a stretch laminate 100, constructed in accordance with the present invention, can be created via a process 188 of the present invention. As shown, the stretch laminate 100 may comprise a first substrate 103 provided by a first substrate supply 102 and an elastic film 118 provided by an elastic film supply 117. An adhesive 116 can be applied to the first substrate 103 by a first adhesive source 110. In addition, as shown, in some embodiments, the stretch laminate 100 may further comprise a second substrate 105 which is provided by a second substrate supply 104. Similar to the first substrate 103, the adhesive 116 can be applied to the second substrate 105 by a second adhesive source 112. Embodiments where the adhesive 116 applied by the first adhesive source 110 and the adhesive 116 applied by the second adhesive source 112 comprise different materials, different properties and/or different chemistries, are contemplated.

As shown, in some embodiments, the first substrate 103, the second substrate 105, and the elastic film 118, can be supplied to a nipping member 150. The nipping member 150 may comprise a first nip roll 152 and a second nip roll 154 which form a nip 156 in between the first nip roll 152 and the second nip roll 154. As the first substrate 103, the elastic film 118, and the second substrate 105, pass through the nip 156 of the nipping member 150, the first nip roll 152 and the second nip roll 154 join the first substrate 103, the elastic film 118, and the second substrate 105, thereby forming an intermediate stretch laminate 90.

The first substrate web 103 can be joined to the elastic film 118 in a face to face orientation. Similarly, in embodiments including the second substrate 105, the second substrate 105 can be joined to the elastic film 118 in a face to face orientation.

Downstream (direction 1021) of the nipping member 150, in some embodiments, the intermediate stretch laminate 90 can be mechanically activated by a mechanical activation member 170, thereby producing the stretch laminate 100. The intermediate stretch laminate 90 is a stretch laminate which has not been mechanically activated.

The mechanical activation member 170 may comprise a first activation roll 172 and a second activation roll 174. Each of the first activation roll 172 and the second activation roll 174 may comprise a plurality of teeth. The teeth of the first activation roll 172 and the teeth of the second activation roll 174 can intermesh with each other.

It has been discovered that the material which makes up a stretch laminate can greatly influence the number of defects which the stretch laminate exhibits from a mechanical activation process. It has also been discovered that careful material selection can reduce the number of defects that the stretch laminate exhibits from the mechanical activation process.

Through utilization of a ring rolling simulation press, data can be acquired on intermediate stretch laminates which can provide some insight as to the number of defects the resulting stretch laminate will exhibit from the mechanical activation process. The ring rolling simulation press can simulate the mechanical activation process on an intermediate stretch laminate. In doing so, the ring rolling simulation press typically takes the intermediate stretch laminate to failure. The ring rolling simulation press is discussed in U.S. Pat. No. 6,843,134.

Figure 2A:
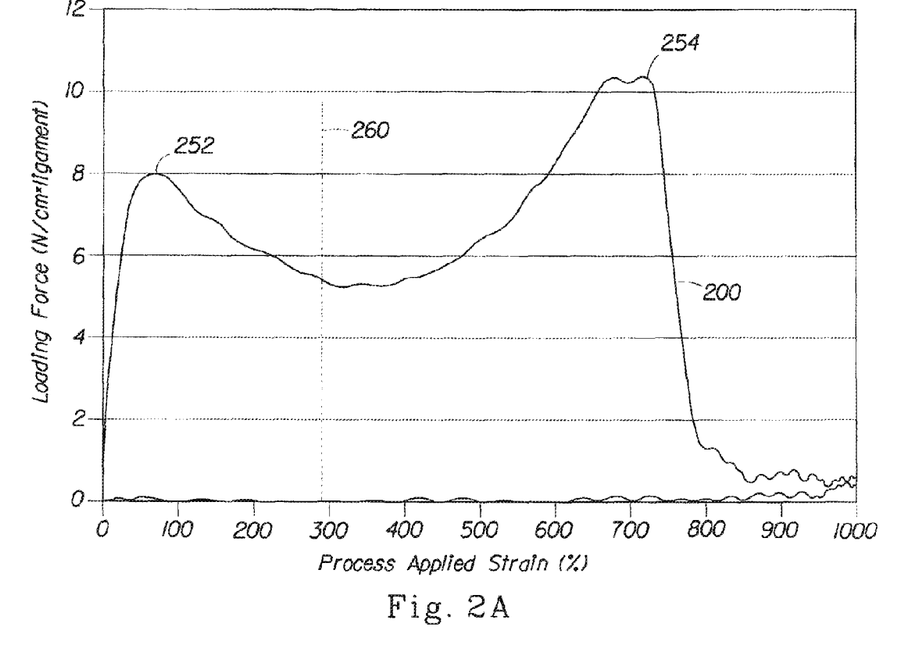
FIG. 2A is a graphical representation showing the loading force of an intermediate stretch laminate of the present invention.
Figure 2B:
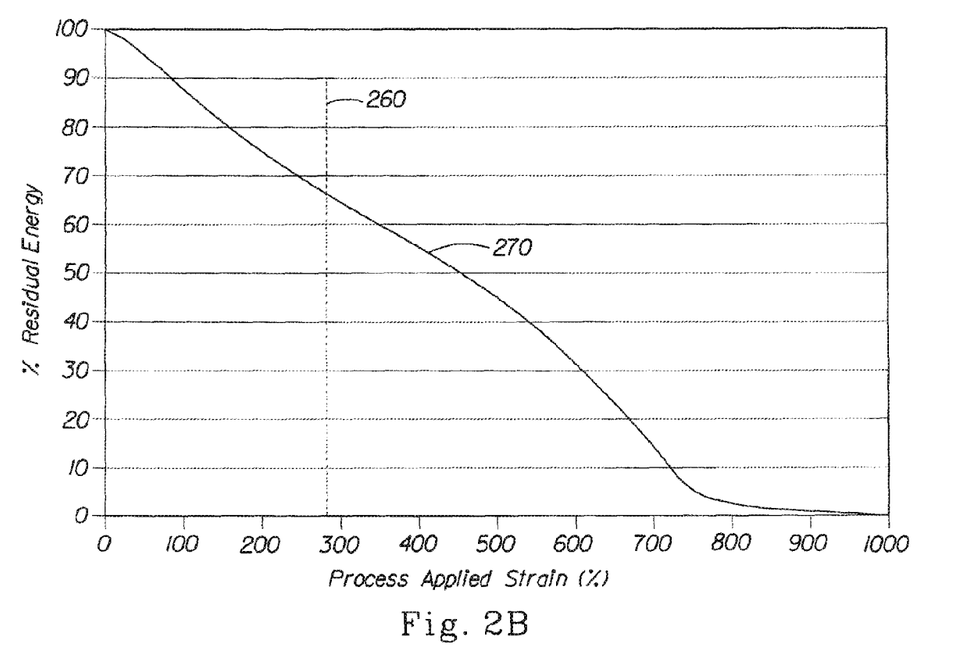
FIG. 2B is a graphical representation showing the residual energy of the intermediate stretch laminate of FIG. 2A.

FIG. 2A shows a graphical representation of the behavior of an intermediate stretch laminate when taken to failure on the ring rolling simulation press. FIG. 2B shows a graphical representation of a residual energy of the intermediate stretch laminate. The residual energy is a derived function based on collected data from the simulation of the mechanical activation process on the intermediate stretch laminate and equations that are provided hereafter.

As shown in FIG. 2A, a curve 200 represents the performance of an intermediate stretch laminate constructed in accordance with the present invention. As shown, a sufficient strain can be applied which takes the intermediate stretch laminate to complete failure, e.g. 1000%. During the course of applying the strain, the intermediate stretch laminate can exhibit two peaks.

Without wishing to be bound by theory, a first peak 252 is believed to represent the cumulative properties of the first substrate and/or the second substrate in conjunction with the adhesive and the elastic film of the stretch laminate. However, it is believed that the first peak 252 is predominantly made up of the properties of the first substrate and/or second substrate. As shown, the first peak 252 can occur at about 80% strain. It is further believed that the decline in the curve at strains greater than about 80% represents a breakdown in the individual fibers which make up the first substrate and/or the second substrate of the intermediate stretch laminate.

Without wishing to be bound by theory, a second peak 254 is believed to be associated with a peak load of the elastic film of the intermediate stretch laminate. As shown, the second peak 254 occurs at a strain of about 720%. It is believed that the decline in the curve at strains greater than about 720% represents a breakdown in the elastic film of the intermediate stretch laminate.

A process applied strain line 260 can indicate to the engineer or technician various properties of the intermediate stretch laminate at a calculated strain for a mechanical activation process. For example, as shown the process applied strain line 260 is at about 290% strain. This indicates that the maximum calculated strain for the mechanical activation process is about 290%. An intersection between the process applied strain line 260 and the curve 200 indicates that the intermediate stretch laminate has a loading force of about 5.5 (N/(cm*ligament)) at the process applied strain of about 290%.

As shown in FIG. 2B, curve 270 represents a residual energy of the intermediate stretch laminate of FIG. 2A. The residual energy of the intermediate stretch laminate is a measure of the residual structure left in the intermediate stretch laminate at any given strain. For example, as shown, at 0% strain, the intermediate stretch laminate has 100% of its residual energy remaining. In contrast, at complete failure, e.g. 1000% strain, the intermediate stretch laminate has 0% residual energy remaining. As shown, at the process applied strain of about 290%, the intermediate stretch laminate has a residual energy of about 65%. The residual energy of the intermediate stretch laminate can be calculated via equations which are provided hereafter in step 9 of the METHOD FOR TESTING LAMINATED STRUCTURES AND COMPONENTS THEREOF.

Figure 3:
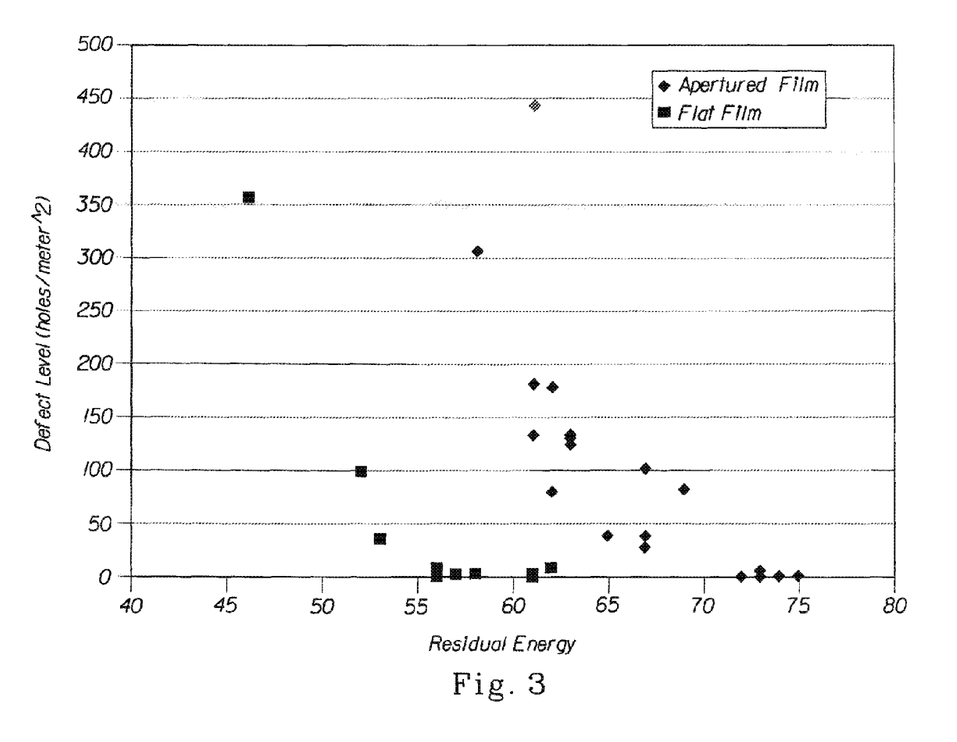
FIG. 3 is a graphical representation showing a relationship between residual energy and defect level for apertured films and for flat films.

It has been discovered that residual energy can vary depending on the materials utilized in the intermediate stretch laminate. For example, in order to achieve reduced defects, an intermediate stretch laminate utilizing a flat film can have a lower residual energy at a process applied strain than an intermediate stretch laminate utilizing an apertured film. FIG. 3 shows the dichotomy between the residual energy requirements of the flat film and apertured film stretch laminates.

The distinction between apertured films and flat films is that flat films do not have apertures therein. Exemplary apertured films which are suitable for use with the present invention, in some embodiments, have an open area of between about 8% to about 20% or any individual number within the range. In other embodiments, the open area of the apertured films may range from about 10% to about 15%. Additionally, in some embodiments, the apertured films can have apertures which have an area of between about 0.2 mm² to about 4.5 mm² or any individual number within the range. In some embodiments, the apertures can have an area of between about 0.2 mm to about 1.1 mm².

As shown in FIG. 3, in some embodiments, an intermediate stretch laminate utilizing a flat film can exhibit reduced defects from a mechanical activation process when the intermediate stretch laminate has a residual energy of greater than or equal to about 50% at the process applied strain. In other embodiments, the intermediate stretch laminate can exhibit reduced defects when the intermediate stretch laminate has a residual energy of greater than or equal to about 60% at the process applied strain. In yet other embodiments, the intermediate stretch laminate has a residual energy of greater than or equal to about 70% at the process applied strain.

An intermediate stretch laminate utilizing an apertured film can similarly exhibit reduced defects from a mechanical activation process, in some embodiments, when the intermediate stretch laminate has a residual energy of greater than or equal to about 60% at the process applied strain. In other embodiments, the intermediate stretch laminate has a residual energy of greater than or equal to about 65% at the process applied strain. In yet other embodiments, the intermediate stretch laminate has a residual energy of greater than or equal to about 70% at the process applied strain.

Method of Increasing Residual Energy of an Intermediate Stretch Laminate:

As previously discussed, the behavior of an intermediate stretch laminate can be greatly influenced by the materials used in the construction of the intermediate stretch laminate. Consequently, there are many ways of increasing the residual energy of an intermediate stretch laminate at a process applied strain. For example, in some embodiments, the first substrate and/or the second substrate of an intermediate stretch laminate can be of a heavier basis weight. In other embodiments, the first substrate and/or the second substrate of the intermediate stretch laminate can be of lighter basis weight. Utilizing, for example, the ring rolling simulation press, mentioned heretofore, the appropriate basis weight for a given mechanical activation process can be determined.

Additionally, in embodiments where the first substrate 103 (shown in FIG. 1) and/or the second substrate 105 (shown in FIG. 1) comprise nonwovens, the chemistry of the nonwovens can impact the amount of residual energy which is exhibited by the intermediate stretch laminate. Utilizing, for example, the ring rolling simulation press, mentioned heretofore, the appropriate chemistry for the nonwovens can be determined.

The adhesive which is applied to the first substrate 103 (shown in FIG. 1) and/or the second substrate 105 (shown in FIG. 1) can impact the amount of residual energy which the intermediate laminate exhibits. Without wishing to be bound by theory, it is believed that the interaction between the adhesive and the first substrate and/or the second substrate can increase the residual energy when the adhesive interaction with the first and/or second substrates is reduced. For example, it is believed that when the adhesive has a ductile property, applied strains to the substrates can be distributed more evenly throughout the substrates. In contrast, it is believed that an adhesive which is not ductile can anchor the individual fibers of the substrates, thereby increasing the localized strain each individual fiber experiences. It is believed that this increase in localized strain can cause premature failure in the substrates, thereby reducing the residual energy of the intermediate stretch laminate. Utilizing, for example, the ring rolling simulation press, mentioned heretofore, the appropriate adhesive can be determined.

The elastic film utilized in the intermediate stretch laminate can also impact the residual energy of the intermediate stretch laminate. In addition to the dichotomy between the flat films and the apertured films, a modification of the elastic film used in the intermediate stretch laminate can increase residual energy of the intermediate stretch laminate at a process applied strain. For example, without wishing to be bound by theory, it is believed that a film having a higher peak load (see item 254 in FIG. 2A) can contribute significantly to the residual energy of the intermediate stretch laminate. It is further believed that an increase in the basis weight of the film can increase the residual energy of the intermediate stretch laminate. Utilizing, for example, the ring rolling simulation press, mentioned heretofore, the appropriate basis weight and chemistry of the elastic film can be determined.

The first substrate 103 (shown in FIG. 1) and/or the second substrate 105 (shown in FIG. 1) can be wovens, nonwovens, fabrics, the like, or combinations thereof. In embodiments where the first substrate 103 (shown in FIG. 1) and/or the second substrate 105 (shown in FIG. 1) comprise nonwovens, any suitable basis weight nonwoven can be used in the intermediate stretch laminate. An exemplary range of nonwoven basis weights can be from about 8 gsm to about 40 gsm or any basis weight within the range. Some suitable nonwovens are listed in the examples described hereafter.

Exemplary nonwovens of the present invention can comprise fibers made of polypropylene, polyethylene, polyolefins, bicomponent fibers, or any combination thereof. Exemplary process for these nonwovens can be carded, spunbond, meltblown, or combinations of spunbond/meltblown.

Exemplary adhesives for use in the present invention may comprise styrene-olefin-styrene triblock copolymers such as styrene-isoprene-styrene, styrene-butadiene-styrene, or combinations thereof. In some embodiments, the basis weight of the adhesive is typically in a range from about 4 gsm to about 28 gsm or any basis weight within the range. The basis weight of the adhesive is measured as the total amount of adhesive over the entire surface area of the substrate to which the adhesive is applied. Some suitable adhesives are listed in the examples discussed hereafter.

Exemplary films, either flat or apertured, for use with the present invention can have basis weights which range from about 10 gsm to about 100 gsm or any basis weight within the range. Also, exemplary films may comprise polypropylene, polyethylene, polyolefins, styrene-olefin-styrene triblock copolymers such as styrene-isoprene-styrene, styrene-butadiene-styrene, or combinations thereof.

It has also been discovered that temperatures of the components of an intermediate stretch laminate, i.e. substrates, adhesive, and elastic film, during mechanical activation can affect the residual energy of the intermediate stretch laminate. An intermediate stretch laminate may exhibit a residual energy within the range specified previously when the intermediate stretch laminate is at an equilibrium temperature of 25° C. during the simulation of the mechanical activation process. However, the same intermediate stretch laminate may not exhibit a residual energy within the range specified when at 50° C. during simulation.

It has been discovered that the residual energy range specified above for the present invention may be obtained by controlling the temperature at which the constituent materials, i.e. nonwoven(s), films, or adhesives, are mechanically activated. For example, an increase in residual energy can occur where the first substrate and/or the second substrate are mechanically activated at an elevated temperature. In contrast an elastic film may increase the residual energy of the intermediate stretch laminate when cooled to a particular temperature.

During conventional stretch laminate processing, both the substrates and the elastic film are typically introduced into the process at room temperature which can be about 22° C. The adhesive is generally applied to the substrates at about a temperature of 162° C. Thus, the application of the adhesive to a substrate typically increases the temperature of the substrate. Additionally, after the elastic film is joined to the substrate and the adhesive, the temperature of the elastic film can increase and cause the temperature of the substrate to decrease. This can result in a decrease of residual energy.

Another aspect of the present invention pertains to controlling the temperature at which the individual components of the intermediate stretch laminate are mechanically activated. For example, in some embodiments, the substrates and the adhesive can be mechanically activated at a first temperature and a second temperature, respectively, while the elastic film is activated at a third temperature. In some embodiments, the second temperature can be greater than the first temperature which can be greater than the third temperature. In other embodiments, the first temperature can be about equal to the second temperature. In yet other embodiments, the first temperature can be greater than the second temperature which is greater than the third temperature.

Controlling the temperatures of the substrates, the elastic film, and the adhesive during mechanical activation can be effected by any suitable means known in the art. For example, the amount of time that the elastic film is in contact with the adhesive and the substrates can be decreased such that the temperature of the elastic film does not increase to such an extent as it would for a larger amount of time in contact. As another example, the elastic film can be pre-cooled such that the initial elastic film temperature is less than about 22° C. In yet another example, the substrates can be pre-heated such that the initial substrate temperature is greater than about 22° C.

Yet another factor which can affect the amount of residual energy which an intermediate stretch laminate exhibits is the rate of strain of the mechanical activation process. In general, conventional stretch laminates are mechanically activated at strain rates which are under 100 s$^{-1}$. Typically, for strain rates under 100 s$^{-1}$, residual energies of the intermediate stretch laminates are higher than the residual energy for the same intermediate stretch laminate at a higher strain rate.

In contrast, in some embodiments, stretch laminates constructed in accordance with the present invention, exhibit reduced defects from mechanical activation processes at strain rates of greater than about 100 s$^{-1}$. In other embodiments, the strain rates are greater than or equal to about 200 s$^{-1}$. In yet other embodiments, the strain rates are greater than or equal to about 300 s$^{-1}$. In yet other embodiments, the strain rates are greater than or equal to about 500 s$^{-1}$.

Apparatus for Measuring Residual Energy of an Intermediate Laminated Structure and Obtaining Measurements Therefrom:

The mechanical activation process can be simulated on a specimen while data is obtained on the specimen via the ring rolling simulation press mentioned heretofore. The ring rolling simulation press is further described in U.S. Pat. No. 6,843,134 entitled "Ring Rolling Simulation Press", issued to Anderson et al. and U.S. Patent Application Publication No. US20040173036A1.

Method for Testing Laminated Structures and Components Thereof:

The following tests are conducted using a ring rolling simulation press as further described in U.S. Pat. No. 6,843,134 entitled "Ring Rolling Simulation Press", issued to Anderson et al. and U.S. Patent Application Publication No. US20040173036A1.

Sample Preparation:
1. Prepare an intermediate stretch laminate in accordance with normal manufacturing procedures.
2. Cut a sample from the intermediate stretch laminate. Measurements for the sample are discussed further regard to step 6 of the testing procedure.

Testing Procedures:
1. Set up the simulation apparatus as described in U.S. Pat. No. 6,843,134 entitled "Ring Rolling Simulation Press".
2. Determine/measure parameters of the mechanical activation process being simulated.

Figure 4:
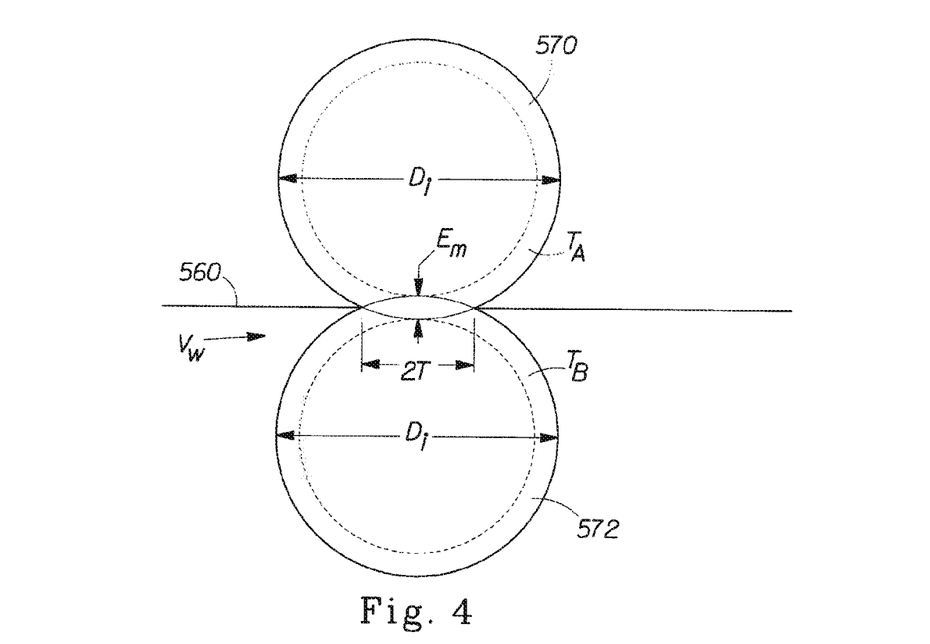
FIG. 4 is a schematic view showing a mechanical activation member.

Regarding FIG. 4, several parameters from the mechanical activation process being simulated are measured or determined. One of the parameters that is determined is the web velocity $V_w$, i.e., the velocity at which an intermediate laminated structure 560 runs between a first activation roll 570 and a second activation roll 572 in the mechanical activation process. Another parameter which is determined is a depth of engagement E(t) of the first and second teeth $T_A$ and $T_B$ on the first and second activation rolls 570 and 572 as a function of time; the pitch p of the first and second teeth $T_A$ and $T_B$ on the first and second activation rolls 570 and 572; and the diameter Di of the first and second activation rolls should be determined as well. These factors will determine similar parameters for the simulation of the actual mechanical activation process on the simulation apparatus.

a. Measure the maximum depth of engagement of the first and second teeth for the mechanical activation process.
b. Determine the depth of engagement as a function of time.

The depth of engagement of first and second teeth $T_A$ and $T_B$ engaging a given point on the laminated structure as a function of time is defined by the following equations:

$$T = a\cos\left[1 - \frac{E_M}{Di}\right] \cdot \left[\frac{Di}{2 \times V_w}\right]$$

-continued $$E(t) = E_M = Di \cdot \left[1 - \cos\left[a\cos\left(1 - \frac{E_M}{Di}\right) \cdot \left(\frac{t}{T} - 1\right)\right]\right]$$

$E_M$ is equal to the maximum depth of engagement of the first and second teeth $T_A$ and $T_B$;

Di is equal to the diameter of the first and second activation rolls 570 and 572 (it is presumed that the activation rolls 570 and 572 have the same diameter);

t is equal to the process time and has a value from 0 to 2 T; and

T is equal to one-half of the total time a given point on the laminated structure is engaged by teeth $T_A$ and $T_B$ on the first and second activation rolls.

c. Determine the pitch of the teeth $T_A$ and $T_B$ of the first and second activation rolls in the mechanical activation process being simulated.

Figure 5:
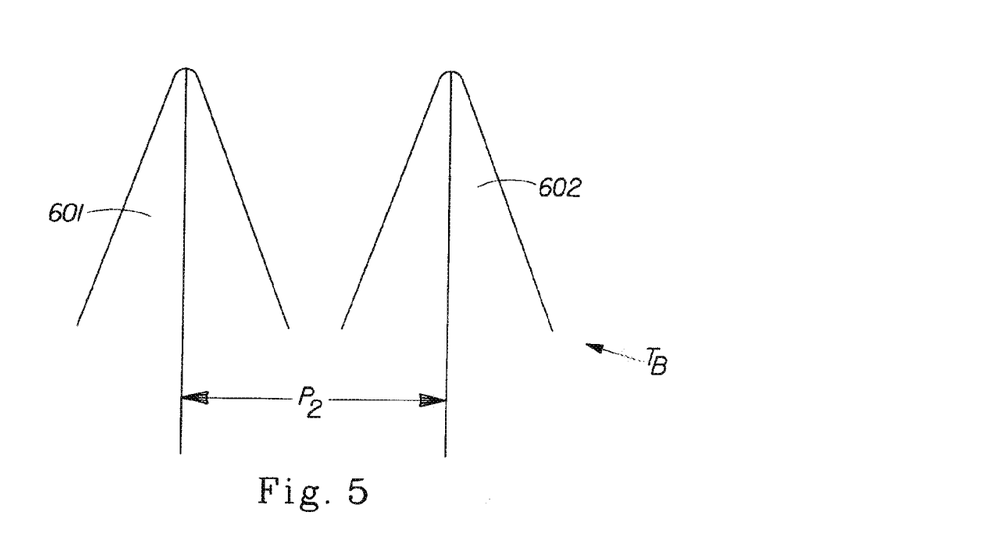
FIG. 5 is a schematic view showing a plurality of teeth in the mechanical activation member of FIG. 4.

As an example, as shown in FIG. 5, the pitch of teeth $T_B$ is equal to the distance $p_2$ between the vertical centerlines of a first tooth 601 and a second tooth 602 on an activation roll. The pitch of the teeth $T_A$ is measured similarly.

d. Determine the diameter Di of the first and second activation rolls.

The diameter Di of either the first or second activation rolls spans from a first tooth tip radius of a first tooth to a second tooth tip radius of the first tooth. The second tooth tip radius is at an angle of about 180° apart from the first tooth tip radius.

Note that all of the equations, either herein or incorporated by reference, are based on an assumption that the diameter Di of the first activation roll is equal to the diameter Di of the second activation roll. Where the diameters of the first and second activation rolls differ, the simulation process described herein remains the same with the exception that the equations corresponding to the variables mentioned above must be re-derived taking into account the difference in roll diameters. One skilled in the art would be able to modify the equations provided herein or incorporated by reference in the event that the diameters of the first activation roll and the second activation roll differed.

e. Determine a home position of the translatable carriage of the simulation apparatus.

The home position is maximum distance the carriage, i.e. the second plate, is away from the first plate. For example, the home position is 75 mm in U.S. Pat. No. 6,843,134.

f. Determine the process applied strain as a function of time and strain rate as a function of time for the mechanical activation process that is being simulated.

Process applied strain as a function of time and final strain is calculated via equations provided U.S. Pat. No. 6,843,134. The average strain rate as a function of time is calculated by taking the first derivative of the strain as a function of time, i.e. Strain (t). The first derivative of Strain(t) is derived using, for example, a commercially available math processing software package such as Mathcad™ version 11.0 manufactured by Mathsoft Inc. located in Cambridge Mass.

g. Determine the temperature of each of the elements of the laminated structure prior to mechanical activation.

A suitable method for determining the temperature of the elements of the laminated structure prior to mechanical activation involves creating a transient thermal model to estimate the heat transfer process. A suitable software for creating and evaluating such a model is available under the trade name FEMLAB™ manufactured by Comsol, Inc. in Stockholm, Sweden.

i. Determine various properties of the materials that will be used to make the stretch laminate.

Several properties of the nonwovens, the film, the adhesives, and the ambient air are determined, including the bulk average heat capacity, bulk average thermal conductivity, the bulk average density, and the initial temperature. The bulk average basis weight and the velocity of the nonwovens, the film, and the adhesives, are determined as well. In addition, the crystallization temperature, the crystallization rate constant, and the heat of crystallization, are determined for the adhesives. Heats of fusion and melt points for the nonwovens and for the films are also determined.

The variables mentioned above can be found, in some instances, from tables. However, when the variables are not readily available by table, then the following procedures apply. Thermal conductivity is determined in accordance with ASTM D 5930. Density is determined in accordance with BS EN ISO 845. Heat capacity is determined in accordance with ASTM E 1269. Melt/crystallization transitions are determined in accordance with ASTM D 3418. Heats of fusion/crystallization are determined in accordance with ASTM E 793.

ii. Determine the process conditions for the laminate formation process and the mechanical activation process.

The distance that the substrate(s) travel from the point of adhesive application to the point of attachment to the elastic film is determined. Also, the distance that the intermediate laminated structure (i.e. the substrates, adhesive, and elastic film) travels between the point of attachment and the point of engagement by the activation rolls is determined.

iii. Input properties from step i. and step ii. into the transient thermal model.

iv. Run the transient thermal model.

v. Store the temperatures calculated from the transient thermal model.

The transient thermal model, after running, provides calculated temperatures for the substrate(s), the adhesive, and the elastic film, just prior to engagement by the activation rolls.

3. Equip the simulation apparatus with the appropriate first and second sets of teeth in accordance with the calculations from the mechanical activation process which is being simulated.

Teeth of varying pitch can be implemented in the simulation apparatus. The first and second sets of teeth are selected in accordance with the pitch of the teeth on the first and second activation rolls. In addition, the first and second sets of teeth are selected in accordance with the depth of engagement of the teeth on the first and second activation rolls. Teeth at minimum are at least equal to the length $E_M$ plus the thickness of the sample.

4. Calibrate the simulation apparatus. The procedure for calibrating the high speed research press is described in U.S. Pat. No. 6,843,134.

5. Input activation parameters from the measurements of step 2 into the drive controller.

The equations for controlling the carriage are discussed in detail in U.S. Pat. No. 6,843,134 entitled "Ring Rolling Simulation Press", issued to Anderson et al. and U.S. application Ser. No. 10/422,879 entitled "A Simulation Apparatus", filed on Apr. 24, 2003.

Note that for the simulation the process applied strain of step 2e is not utilized. The sample should be taken to failure. Therefore, the strain for this simulation is set to greater than or equal to 1000%.

6. Mount samples of the intermediate stretch laminate in the holder of the simulation apparatus.

Figure 6:
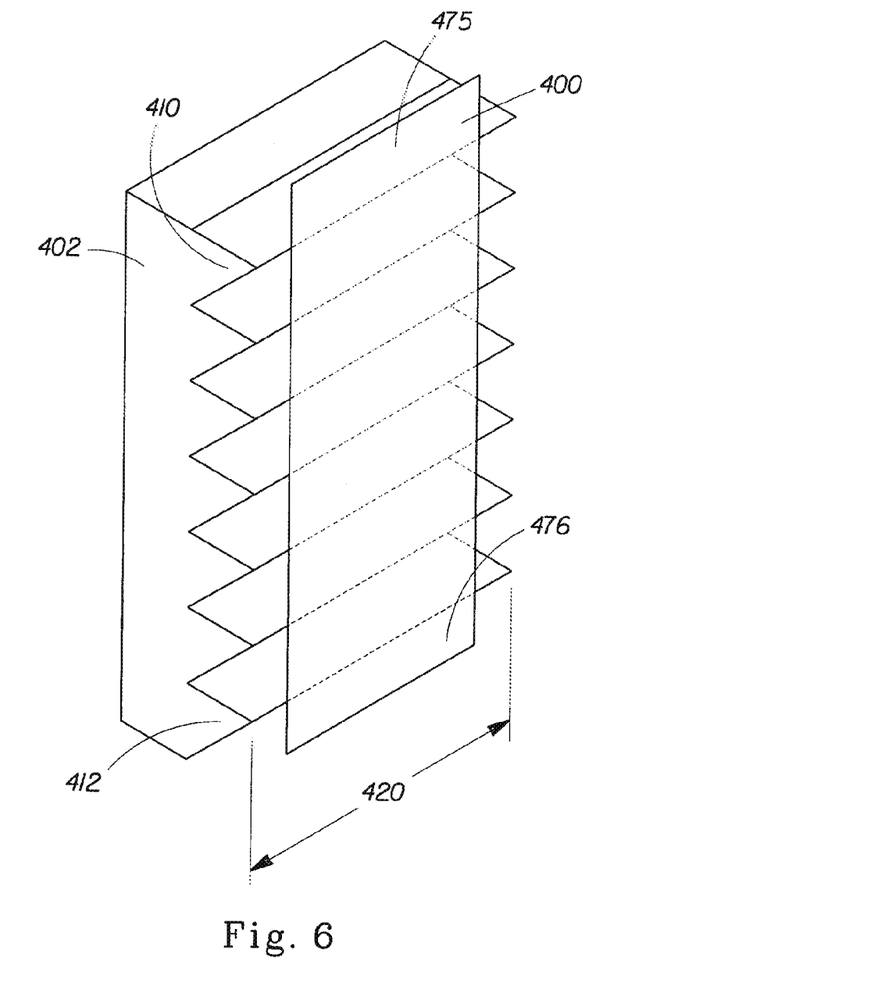
FIG. 6 is a schematic view showing a first plate having a plurality of teeth, the first plate for use in a ring rolling simulation press.

As shown in FIG. 6, the sample 400 is mounted such that a first end region 475 of the sample 400 is positioned longitudinally outboard of a first tooth 410. Similarly, the sample 400 is mounted such that a second end region 476 of the sample 400 is positioned longitudinally outboard of a last tooth 412. The width of the sample 400 should be less than a width 420 of a first set of teeth 402.

The sample 400 is tautly mounted in the holder such that when the second set of teeth engage the first set of teeth 402, the sample 400 experiences strain rather than simply displacement with respect to the first set of teeth 402 or second set of teeth depending on where the holder is mounted. The sample 400 is not strained more than 2% prior to simulation.

7. Simulate the mechanical activation process on the sample 400.

The temperature of the substrate(s) determined from step 2g are used for the purpose of mechanical activation simulation. Therefore, the sample 400 may have to be heated or cooled. Heating a sample is further described in U.S. Pat. No. 6,843,134.

8. Store the data from the simulation of step 7.
9. Determine a residual energy of the nonwoven from the data of the simulation of step 8.

The normal force experienced by load cells in the simulation apparatus is provided to a drive controller which provides the information to a processor/memory unit. Because the sample undergoing the simulation is being strained, work is being done on the sample. Therefore, the normal force data in conjunction with the carriage position data collected by the processor/memory unit can be converted into work to express the amount of energy applied to and/or absorbed by the sample.

The activation energy for the sample is determined by integrating an area under a curve representing the normal force experienced by the load cell versus the carriage position. The numerical integration by trapezoid rule shall be used to estimate values under the curve mentioned previously. The equation is as follows:

$$E_a = \sum_{i=2}^{n} \left[ (P_i - P_{i-1}) * \left( \frac{F_{n_i} + F_{n_{i-1}}}{2} \right) \right]$$

where: n=the number of data points based on evenly spaced time slices; P=Carriage Position (m); $F_n$=Load Cell Force (N); and $E_a$=total energy under the curve representing activation energy for the sample. Note that these variables apply to the equations listed below as well.

The residual energy of the workpiece is determined via the following equations.

The percent residual energy at any point beyond the peak can then be found by the following equation:

$$E_R = \left[ \frac{E_a - \sum_{i=2}^{n_t} \left[ (P_i - P_{i-1}) * \left( \frac{F_{n_i} + F_{n_{i-1}}}{2} \right) \right]}{E_a} \right] * 100$$

where: $n_t$=number of points up to some time t, wherein t is the time of the evaluation of the percentage of residual energy; $E_a$=activation energy described in the equation above; and $E_R$=the percent residual energy of the sample. Note that the equations for residual energy above can also compare the activation energy from the peak load of the simulated specimen.

Recall that a selection criterion of an intermediate stretch laminate within the scope of the present invention is to have a residual energy which is greater than or equal to 50% at the process applied strain calculated in step 2d, in some embodiments. In other embodiments, the selection criterion of an intermediate stretch laminate is that the residual energy be greater than 60%.

Method of Finding Defects:

A defect on a laminated structure caused by the mechanical activation process may include holes. The majority of defects which occur on laminated structures because of the mechanical activation process can be holes. For example, during the mechanical activation process, holes can be created in the nonwoven or the film. For purposes of the present invention, a hole is defined as a defect in the stretch laminate which is greater than or equal to 1 mm in diameter when the laminated structure is stretched under a force of 9.8N. The hole is then measured to the nearest mm while under a tension of 9.8N.

The number of defects can be measured from a 15 m sample of the laminated structure after mechanical activation. For example, a stretch laminate, not constructed in accordance with the present invention, can exhibit in excess of 357 holes/m$^2$. Examples of laminated structures constructed in accordance with the claimed invention are provided below. A reduction in the number of defects in the laminated structure of the claimed invention can range anywhere from about a 1% reduction to about a 100% reduction in the number of defects.

For the examples listed below, Table I provides corresponding strain rates in units of (s$^{-1}$) with the depth of engagement as defined previously. For the values in the following tables, the activation rolls of the mechanical activation process had roll diameters of about 152.4 mm and teeth pitches of 3.81 mm.

Examples of Stretch Laminates Utilizing Apertured Films:

Intermediate stretch laminate samples 1-9 were constructed from two layers of nonwoven each having a basis weight of 27 gsm. The layers of nonwoven are sold under the trade name HEC and manufactured by BBA Fiberweb™, located in Brentwood, Tenn. An elastic apertured film having a basis weight of 80 gsm was sandwiched between the two layers of nonwoven. The film is manufactured by Tredegar Corp., located in Richmond, Va., and has a model number VFE29002. An adhesive was applied to the nonwovens at 7 gsm. The adhesive was applied in a striped pattern with 1 mm adhesive stripes and 1 mm spacing in between adjacent stripes. The adhesive was manufactured by Bostik located in Wauwatosa, Wis., and has a model number H2861.

Intermediate stretch laminate samples 10-12 and 17-19, were constructed from two layers of nonwoven each having a basis weight of 27 gsm. The layers of nonwoven are sold under the trade name Prosoft™ and manufactured by RKW AG Rheinische Kunststoffwerke, located in Worms, Germany. An elastic apertured film having a basis weight of 80 gsm was sandwiched between the two layers of nonwoven. The film is manufactured by Tredegar Corp., located in Richmond, Va., and has a model number VFE29002. An adhesive was applied to the nonwovens at 7 gsm. The adhesive was applied in a striped pattern with 1 mm adhesive stripes and 1 mm spacing in between adjacent stripes. The adhesive was manufactured by Bostik located in Wauwatosa, Wis., and has a model number H2861.

Intermediate stretch laminate samples 13-16 were constructed from two layers of nonwoven each having a basis weight of 27 gsm. The layers of nonwoven are sold under the trade name Prosoft™ and manufactured by RKW AG Rheinische Kunststoffwerke, located in Worms, Germany. An elastic apertured film having a basis weight of 80 gsm was sandwiched between the two layers of nonwoven. The film is manufactured by Tredegar Corp., located in Richmond, Va., and has a model number VFE29002. An adhesive was applied to the nonwovens at 7 gsm. The adhesive was applied in a striped pattern with 1 mm adhesive stripes and 1 mm spacing in between adjacent stripes. The adhesive was manufactured by National Starch, located in Bridgewater, N.J., and has a model number 12991-10-17.

The mechanical activation process was simulated on each of the samples 1-12 for a calculated web speed of 3.33 m/sec. The mechanical activation process was simulated on each of the samples 13-19 for a calculated web speed of 5.0 m/sec. The samples were exposed to various depths of engagement, process applied strains, strain rates, and activation temperatures. The results of the simulation including the number of defects in each stretch laminate and their residual energies are disclosed in Table I.

TABLE I

| Sample # | Depth of Engagement mm | Process Applied Strain % | Process Applied Strain Rate sec −1 | Activation Temperature degrees C. | Defect Level holes/m^2 | Residual Energy % |
| --- | --- | --- | --- | --- | --- | --- |
| 1 | 5.5 | 209 | 561 | 22 | 0 | 72 |
| 2 | 5.5 | 209 | 561 | 55 | 0 | 74 |
| 3 | 7.0 | 285 | 687 | 22 | 138 | 67 |
| 4 | 7.0 | 285 | 687 | 35 | 38 | 65 |
| 5 | 7.0 | 285 | 687 | 55 | 132 | 61 |
| 6 | 7.5 | 310 | 726 | 22 | 124 | 63 |
| 7 | 7.5 | 310 | 726 | 35 | 130 | 63 |
| 8 | 7.5 | 310 | 726 | 45 | 181 | 61 |
| 9 | 7.5 | 310 | 726 | 55 | 305 | 58 |
| 10 | 5.0 | 184 | 515 | 35 | 0 | 73 |
| 11 | 6.0 | 234 | 604 | 35 | 27 | 67 |
| 12 | 7.0 | 285 | 687 | 35 | 78 | 62 |
| 13 | 5.0 | 184 | 774 | 35 | 5 | 73 |
| 14 | 6.0 | 234 | 908 | 35 | 100 | 67 |
| 15 | 7.0 | 285 | 1031 | 35 | 133 | 63 |
| 16 | 8.0 | 336 | 1146 | 35 | 444 | 61 |
| 17 | 5.0 | 184 | 774 | 35 | 0 | 75 |
| 18 | 6.0 | 234 | 908 | 35 | 81 | 69 |
| 19 | 7.0 | 285 | 1031 | 35 | 178 | 62 |

As shown in Table I, in general, as the residual energy decreases, the number of defects generally increases. For example, comparing sample 1 with sample 9, the residual energy decreases from about 72% to about 58% and correspondingly, the number of defects increases from about 0 defects/m² to about 305 defects/m². In yet another example, comparing sample 8 with sample 9, the residual energy decreases from about 61% to about 58%, and correspondingly, the number of defects increases from about 181 defects/m² to about 305 defects/m².

As discussed previously, there are numerous factors which can impact the amount of residual energy that an intermediate stretch laminate has. For instance, as shown in Table I, as the strain rate increases, the residual energy generally decreases. For example, comparing sample 13 with sample 16 the strain rate increases from about 774 s$^{-1}$ to about 1146 s$^{-1}$, and correspondingly, the residual energy decreases from about 72% to about 63%.

Another noticeable trend is that as the temperature increases, the residual energy generally decreases. For example, comparing sample 4 with sample 5 the activation temperature increases from about 35 degrees C. to about 55 degrees C., and correspondingly, the residual energy decreases from about 65% to about 61%. In another example, comparing sample 6 with sample 9, the activation temperature ranges from about 22 degrees C. to about 55 degrees C. and correspondingly, the residual energy decreases from about 63% to about 58%. In contrast, comparing sample I and sample 2, the residual energy at an activation temperature of 55 degrees C. is greater than the residual energy at 22 degrees C. Without wishing to be bound by theory, it is believed that at lower strains, e.g. below 285%, the activation temperature has less of an impact on the residual energy than at higher strains, e.g. above 285%. Note the similar increase in temperature between sample 3 and sample 5; however, the number of defects in sample 5 is slightly less than the number of defects in sample 3.

Additionally, modifying the materials of the intermediate stretch laminate can impact the number of defects which a stretch laminate exhibits from the mechanical activation process. For example, comparing sample 4 with sample 12, the defect level for sample 12 is 78 defects/m² as opposed to 38 defects/m² for sample 4. The samples were exposed to identical activation temperatures, process applied strains, strain rates, and depths of engagement; however, the nonwovens of sample 4 and the nonwovens of sample 12 are from different manufacturers may be of a different chemical makeup.

Examples of Stretch Laminates Utilizing Flat Films:

Intermediate stretch laminate samples 20-21 were constructed from two layers of nonwoven each having a basis weight of 27 gsm. The layers of nonwoven are sold under the trade name HEC and manufactured by BBA Fiberweb™, located in Brentwood, Tenn. An elastic flat film having a basis weight of 80 gsm was sandwiched between the two layers of nonwoven. The film is manufactured by Tredegar Corp., located in Richmond, Va., and has a model number VFE29969. An adhesive was applied to the nonwovens at 7 gsm. The adhesive was applied in a striped pattern with 1 mm adhesive stripes and 1 mm spacing in between adjacent stripes. The adhesive was manufactured by Bostik located in Wauwatosa, Wis., and has a model number H2861.

Intermediate stretch laminate sample 22 was constructed from two layers of nonwoven each having a basis weight of 17 gsm. The layers of nonwoven are sold under the trade name SMS and manufactured by BBA Fiberweb™, located in Brentwood, Tenn. An elastic flat film having a basis weight of 67 gsm was sandwiched between the two layers of nonwoven. The film is manufactured by Tredegar Corp., located in Richmond, Va., and has a model number 31598. An adhesive was applied to the nonwovens at 7 gsm. The adhesive was applied in a striped pattern with 1 mm adhesive stripes and 1 mm spacing in between adjacent stripes. The adhesive was manufactured by Bostik located in Wauwatosa, Wis., and has a model number H2861.

Intermediate stretch laminate samples 23-24 were constructed from two layers of nonwoven each having a basis weight of 27 gsm. The layers of nonwoven are sold under the trade name Prosoft™ and manufactured by RKW AG Rheinische Kunststoffwerke, located in Worms, Germany. An elastic flat film having a basis weight of 60 gsm was sandwiched between the two layers of nonwoven. The film is manufactured by Nordenia USA, Inc., located in Jackson, Mo., and has a model number of RR. An adhesive was applied to the nonwovens at 7 gsm. The adhesive was applied in a striped pattern with 1 mm adhesive stripes and 1 mm spacing in between adjacent stripes. The adhesive was manufactured by Bostik located in Wauwatosa, Wis., and has a model number H2861.

Intermediate stretch laminate samples 25-26 were constructed from a single layer of nonwoven having a basis weight of 27 gsm. The nonwoven is sold under the trade name Prosoft™ and manufactured by RKW AG Rheinische Kunststoffwerke, located in Worms, Germany. An elastic flat film having a basis weight of 80 gsm was joined to the nonwoven in a face-to-face orientation. The film is manufactured by Tredegar Corp., located in Richmond, Va., and has a model number VFE29969. An adhesive was applied to the nonwovens at 7 gsm. The adhesive was applied in a striped pattern with 1 mm adhesive stripes and 1 mm spacing in between adjacent stripes. The adhesive was manufactured by Bostik located in Wauwatosa, Wis., and has a model number H2861.

Intermediate stretch laminate samples 27-28 were constructed from two layers of nonwoven each having a basis weight of 27 gsm. The layers of nonwoven are sold under the trade name HEC and manufactured by BBA Fiberweb™, located in Brentwood, Tenn. An elastic flat film having a basis weight of 60 gsm was sandwiched between the two layers of nonwoven. The film is manufactured by Nordenia USA, Inc., located in Jackson, Mo., and has a model number of RR. An adhesive was applied to the nonwovens at 7 gsm. The adhesive was applied in a striped pattern with 1 mm adhesive stripes and 1 mm spacing in between adjacent stripes. The adhesive was manufactured by National Starch, located in Bridgewater, N.J., and has a model number 12991-10-14.

Intermediate stretch laminate samples 29-30 were constructed from two layers of nonwoven each having a basis weight of 27 gsm. The layers of nonwoven are sold under the trade name HEC and manufactured by BBA Fiberweb™, located in Brentwood, Tenn. An elastic flat film having a basis weight of 60 gsm was sandwiched between the two layers of nonwoven. The film is manufactured by Nordenia USA, Inc., located in Jackson, Mo., and has a model number of RR. An adhesive was applied to the nonwovens at 7 gsm. The adhesive was applied in a striped pattern with 1 mm adhesive stripes and 1 mm spacing in between adjacent stripes. The adhesive was manufactured by National Starch, located in Bridgewater, N.J., and has a model number 12991-10-16.

The mechanical activation process was simulated on each of the samples 20-23 for a calculated web speed of 3.33 m/sec. The mechanical activation process was simulated on each of the sample 24 for a calculated web speed of 5.0 m/sec. The samples were exposed to various depths of engagement, process applied strains, strain rates, and activation temperatures. The results of the simulation including the number of defects in each stretch laminate and their residual energies are disclosed in Table II.

TABLE II

| Sample # | Depth of Engagement mm | Process Applied Strain % | Process Applied Strain Rate sec $-1$ | Activation Temperature degrees C. | Defect Level holes/m$^2$ | Residual Energy % |
| --- | --- | --- | --- | --- | --- | --- |
| 20 | 7.0 | 285 | 687  | 22 | 0   | 61 |
| 21 | 7.5 | 310 | 726  | 22 | 3   | 58 |
| 22 | 8.0 | 336 | 763  | 35 | 357 | 46 |
| 23 | 7.0 | 285 | 687  | 35 | 0   | 56 |
| 24 | 7.0 | 285 | 1031 | 35 | 8   | 62 |
| 25 | 7.0 | 285 | 1031 | 35 | 3   | 61 |
| 26 | 8.0 | 336 | 1146 | 35 | 8   | 56 |
| 27 | 7.0 | 285 | 687  | 35 | 3   | 61 |
| 28 | 8.0 | 336 | 763  | 35 | 35  | 53 |
| 29 | 7.0 | 285 | 687  | 35 | 3   | 57 |
| 30 | 8.0 | 336 | 763  | 35 | 97  | 52 |

As shown in Table II, the same trend for apertured films holds true for the flat films tested as well. Namely, as the residual energy decreases, the number of defects generally increases. For example, comparing sample 20 with sample 22, the residual energy decreases from about 61% to about 46% and correspondingly, the number of defects increases from about 0 defects/m$^2$ to about 357 defects/m$^2$. Similarly, the factors of strain rate and activation temperature can impact the amount of residual energy.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflict with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A method of producing a stretch laminate the method comprising the steps of:
    a) forming an intermediate stretch laminate, wherein forming the intermediate stretch laminate comprises the steps of:
        i) providing a first substrate;
        ii) attaching an elastic film to a surface of the first substrate via an adhesive, such that the first substrate and the elastic film are in a face to face orientation, wherein the intermediate stretch laminate has a residual energy of greater than about 46% at a predetermined applied strain, wherein the predetermined applied strain is greater than or equal to about 100%; and
    b) mechanically activating the intermediate stretch laminate at a strain rate of at least about 100 $s^{-1}$.

2. The method of producing a stretch laminate of claim 1, wherein the predetermined applied strain is greater than or equal to about 200%.

3. The method of producing a stretch laminate of claim 1, wherein the predetermined applied strain is greater than or equal to about 300%.

4. The method of producing a stretch laminate of claim 1, wherein the strain rate is greater than or equal to about 500 $s^{-1}$.

5. The method of producing a stretch laminate of claim 1, further comprising the step of mechanically activating the first substrate at a first temperature $T_1$, the adhesive at a second temperature $T_2$, and the film at a third temperature $T_3$, wherein the second temperature $T_2$ is greater than the first temperature $T_1$, and wherein the first temperature $T_1$ is greater than the third temperature $T_3$.

6. The method of producing a stretch laminate of claim 1, wherein the first substrate is a nonwoven.

7. The method of producing a stretch laminate of claim 6, wherein the nonwoven comprises fibers which are selected from the group consisting of polypropylene, polyethylene, polyester, nylon, cellulose, polyamide, or combinations thereof.

8. The method of producing a stretch laminate of claim 1, wherein the elastic film comprises at least one of the following: block co-polymers, styrene-butadiene-styrene, styrene-isoprene-styrene, polypropylene, polyethylene, or combinations thereof.

9. The method of producing a stretch laminate of claim 1, wherein the step of forming an intermediate stretch laminate further comprises the steps of:
    iii) providing a second substrate; and
    iv) attaching the elastic film to a surface of the second substrate via an adhesive, such that the second substrate and the elastic film are in a face to face orientation.

10. The method of producing a stretch laminate of claim 9, wherein the predetermined applied strain is greater than or equal to about 100%.

11. The method of producing a stretch laminate of claim 9, wherein the predetermined applied strain is greater than or equal to about 200%.

12. The method of producing a stretch laminate of claim 9, wherein the predetermined applied strain is greater than or equal to about 300%.

13. The method of producing a stretch laminate of claim 9, further comprising the step of mechanically activating the first substrate and the second substrate at a first temperature $T_1$, the adhesive at a second temperature $T_2$, and the film at a third temperature $T_3$, wherein the second temperature $T_2$ is greater than the first temperature $T_1$, and wherein the first temperature $T_1$ is greater than the third temperature $T_3$.

14. The method of producing a stretch laminate of claim 9, wherein the first substrate and the second substrate are nonwovens.

15. The method of producing a stretch laminate of claim 14, wherein the nonwovens comprise fibers which are selected from the group consisting of polypropylene, polyethylene, polyester, nylon, cellulose, polyamide, or combinations thereof.

16. The method of producing a stretch laminate of claim 9, wherein the elastic film comprises at least one of the following: block co-polymers. styrene-butadiene-styrene, styrene-isoprene-styrene, polypropylene, polyethylene, or combinations thereof.

* * * * *